United States Patent
Roth (10) Patent No.: US 10,919,013 B2
(45) Date of Patent: Feb. 16, 2021

(54) DEVICE AND METHOD FOR DROPLETIZING A FLOWABLE PRODUCT

(71) Applicant: Bernhard Roth, Affalterbach (DE)

(72) Inventor: Bernhard Roth, Affalterbach (DE)

(73) Assignee: IPCO GERMANY GMBH, Fellbach (DE)

( * ) Notice: Subject to any disclaimer, the term of this patent is extended or adjusted under 35 U.S.C. 154(b) by 0 days.

(21) Appl. No.: 15/741,036

(22) PCT Filed: Jun. 27, 2016

(86) PCT No.: PCT/EP2016/064777
§ 371 (c)(1),
(2) Date: Dec. 29, 2017

(87) PCT Pub. No.: WO2017/001310
PCT Pub. Date: Jan. 5, 2017

(65) Prior Publication Data
US 2018/0185804 A1    Jul. 5, 2018

(30) Foreign Application Priority Data

Jul. 1, 2015 (DE) .......................... 10 2015 212 353

(51) Int. Cl.
*B01J 2/20* (2006.01)
*B01J 2/26* (2006.01)
(Continued)

(52) U.S. Cl.
CPC . *B01J 2/20* (2013.01); *B01J 2/26* (2013.01);
*B05C 1/003* (2013.01); *B05C 1/10* (2013.01);
(Continued)

(58) Field of Classification Search
None
See application file for complete search history.

(56) References Cited

U.S. PATENT DOCUMENTS 2,653,350 A * 9/1953 Piperoux ................. B29B 9/065
425/313
2,979,764 A * 4/1961 Andrew ...................... B01J 2/02
425/6
(Continued)

FOREIGN PATENT DOCUMENTS

DE    10 2008 010 351 B3    7/2009
GB         1188462       *  2/1968
(Continued)

OTHER PUBLICATIONS

Notification of Transmittal of International Search Report issued in Application No. PCT/EP2016/064777 dated Sep. 14, 2016 (1 page).
(Continued)

*Primary Examiner* — Joseph S Del Sole
*Assistant Examiner* — Manley L Cummins, IV
(74) *Attorney, Agent, or Firm* — Flynn Thiel, P.C.

(57) ABSTRACT

A device for dropletizing a flowable product, having an outer drum, which is arranged in a rotatable manner on a core and is provided with a plurality of through-openings in its circumference. A feed duct extends in the longitudinal direction of the core and a distribution device bearing against the inner circumference of the outer drum are provided in the core. At least one supply duct is provided between the feed duct and the distribution device along the length of the feed duct, and a shut-off member for setting a free cross section of the at least one supply duct is provided.

15 Claims, 6 Drawing Sheets

(51) Int. Cl.
*B29B 13/04* (2006.01)
*B05C 1/00* (2006.01)
*B05C 1/10* (2006.01)
*B29B 9/10* (2006.01)
*A23G 3/02* (2006.01)

(52) U.S. Cl.
CPC .......... *B29B 13/045* (2013.01); *A23G 3/0236* (2013.01); *B29B 9/10* (2013.01)

(56) References Cited

U.S. PATENT DOCUMENTS

| | | | | |
|---|---|---|---|---|
| 4,029,459 A | * | 6/1977 | Schmiedeke | B30B 11/22 425/202 |
| 4,279,579 A | * | 7/1981 | Froeschke | B29B 9/00 425/6 |
| 4,610,615 A | * | 9/1986 | Froeschke | B01J 2/20 264/13 |
| 4,623,307 A | * | 11/1986 | Froeschke | B29B 9/10 249/102 |
| 4,963,084 A | * | 10/1990 | Froeschke | B01J 2/20 425/331 |
| 5,013,498 A | | 5/1991 | Froeschke | |
| 5,198,233 A | * | 3/1993 | Kaiser | B01J 2/20 425/183 |
| 5,244,370 A | * | 9/1993 | DeMars | A21C 15/002 222/345 |
| 5,286,181 A | * | 2/1994 | Schwager | A23G 3/0247 425/8 |
| 5,382,145 A | * | 1/1995 | Harreither | B01J 2/20 425/8 |
| 5,401,938 A | * | 3/1995 | Froeschke | A23G 1/206 219/602 |
| 5,676,982 A | * | 10/1997 | Duchow | A21C 11/04 425/298 |
| 5,770,235 A | | 6/1998 | Baumann et al. | |
| 6,716,015 B2 | * | 4/2004 | Lumley | B01J 2/04 425/192 R |
| 8,349,229 B2 | * | 1/2013 | Schromm | B01J 2/18 264/8 |
| 2004/0219079 A1 | * | 11/2004 | Hagen | F01K 21/047 422/607 |
| 2004/0265412 A1 | | 12/2004 | Peck | |
| 2005/0158416 A1 | | 7/2005 | Kleinhans et al. | |
| 2006/0283340 A1 | * | 12/2006 | Pallmann | B01J 2/20 100/117 |
| 2010/0242556 A1 | * | 9/2010 | Smith | B01J 2/26 71/59 |
| 2011/0017130 A1 | | 1/2011 | Schromm et al. | |

FOREIGN PATENT DOCUMENTS

| | | |
|---|---|---|
| JP | 60-97830 A | 5/1985 |
| JP | 3-500144 A | 1/1991 |
| JP | 2006523294 A | 10/2006 |
| WO | 2004064990 A2 | 8/2004 |

OTHER PUBLICATIONS

International Search Report with English translation issued in Application No. PCT/EP2016/064777 dated Sep. 14, 2016 (6 pages).
Written Opinion of International Searching Authority issued in Application No. PCT/EP2016/064777 dated Sep. 14, 2016 (5 pages).
Notice of Allowance issued in corresponding Korean Patent Office Application No. 10-2017-7037909 dated Jul. 25, 2019, with English translation (3 pages).
Japanese Office Action issued in Appln. No. 2017-568277 dated Oct. 23, 2018 and English translation (8 pages).

* cited by examiner

DEVICE AND METHOD FOR DROPLETIZING A FLOWABLE PRODUCT

TECHNICAL FIELD

The invention relates to a device for dropletizing a flowable product, having an outer drum, which is arranged in a rotatable manner on a core and is provided with a plurality of through-openings in its circumference. A feed duct for the product to be dropletized, the feed duct extending in the longitudinal direction of the core, and a distribution device bearing against the inner circumference of the outer drum are provided in the core, and at least one supply duct is provided between the feed duct and the distribution device along the length of the feed duct.

BACKGROUND AND SUMMARY

By way of the invention, a device and a method for dropletizing a flowable product with regard to flexibility in the processing of different flowable products are intended to be improved.

According to the invention, in a device for dropletizing a flowable product, having an outer drum, which is arranged in a rotatable manner on a core and is provided with a plurality of through-openings in its circumference, provision is made for a feed duct for the product to be dropletized, the feed duct extending in the longitudinal direction of the core. A distribution device which bears against the inner circumference of the outer drum is provided in the core, and at least one supply duct is provided between the feed duct and the distribution device along the length of the feed duct. A shut-off member for setting a free cross section of the at least one supply duct or of at least one outlet opening, from which the at least one supply duct proceeds, is also provided.

Since a free cross section of the at least one supply duct can be set by means of the shut-off member, the device according to the invention can be set or optimized for different products to be dropletized. In conventional devices for dropletizing a flowable product, it has hitherto always been necessary to dismantle the device and modify for example a distribution device configured as a nozzle strip. By way of the device according to the invention, a throughflow through the at least one supply duct and optionally also a change in the throughflow along the length of the supply duct or along a plurality of supply ducts arranged one after another in the longitudinal direction can be set by means of the shut-off member.

As a result, the device according to the invention can be optimized with respect to the properties of the flowable product to be dropletized, such that the product droplets created are uniform and of very high quality. In this case, with the device according to the invention, it is especially possible for the product droplets to be of uniform size along the length of the outer drum or over the width of a cooling belt. With a device according to the invention, it is possible to dropletize for example melts which are then deposited on a circulating cooling belt and cool and solidify while being transported on said cooling belt. After solidification, the pastilles are removed from the cooling belt and can then be packaged or processed further. Depending on the viscosity of the melt to be dropletized, a different throughflow through the supply duct or supply ducts and the nozzle strip may be necessary. Since a throughflow or a free cross section of the supply duct or supply ducts can be set with the device according to the invention, the device according to the invention can be optimized with respect to a flowable product to be dropletized, without it being necessary to dismantle the device and install other parts to this end.

In a development of the invention, the shut-off member is arranged in a movable manner in the assembled state of the device.

As a result, a free cross section of the at least one supply duct can be set without it being necessary to dismantle the device according to the invention. If appropriate, the shut-off member can even be adjusted during operation of the device. Manual adjustment of the shut-off member is preferred in this case, and adjustment by means of an actuator, for example an electric motor, is also realizable if necessary or desired.

In a development of the invention, the shut-off member is arranged in a displaceable or rotatable manner.

Rotational movements or displacement movements can be realized comparatively easily and can ensure the desired setting of a free cross section of the at least one supply duct or at least one outlet opening, from which the at least one supply duct proceeds. In a development of the invention, the shut-off member is arranged within the feed duct so as to be rotatable about an axis of rotation parallel to the longitudinal axis of the feed duct.

Within the feed duct, not only is there enough space available for the arrangement of the shut-off member, but also the core of the device according to the invention does not need to be modified in order to accommodate a shut-off member. Since the core is surrounded by the rotating outer drum, it is surprisingly easily possible to actuate the shut-off member by a rotational movement about an axis of rotation lying parallel to the longitudinal direction. An actuator for moving the shut-off member can be arranged for example upstream or downstream of the perforated outer drum, as seen in the longitudinal direction.

In a development of the invention, the shut-off member extends along the entire length of a portion of the feed duct, from which the at least one supply duct proceeds.

In this way, the entire length of a supply duct or a plurality of supply ducts can be changed at the same time in terms of their free cross section by means of the shut-off member.

In a development of the invention, the shut-off member is configured in a cylindrical manner.

In this way, the shut-off member can be produced comparatively easily and cost-effectively.

In a development of the invention, an outer circumference of the shut-off member is provided with at least one protrusion, wherein the protrusion is provided to at least partially shut off at least one outlet opening in the feed duct, wherein the supply duct proceeds from the outlet opening. As a result of the provision of protrusions on the outer circumference of the cylindrical shut-off member, a plurality of supply ducts can be set very precisely in terms of their free cross section. Furthermore, it is much easier to mount the shut-off member in the feed duct since the outer circumference of the shut-off member does not have to be configured so as to exactly match the inner circumference of the feed duct. For example, the protrusions can be configured as screw heads of plastics screws. As a result, not only is the cylindrical shut-off member kept at a predefined distance from the inner circumference of the feed duct, but also the screw heads can act as plain bearings at the same time. In the event of wear, the protrusions can then be exchanged very easily.

In a development of the invention, a plurality of protrusions are provided and the protrusions are distributed around the outer circumference of the shut-off member in such a way that an annular gap is formed between an inner circumference of the feed duct and an outer circumference of the shut-off member. Via such an annular gap, the flowable product to be dropletized can then be guided to the at least one supply duct.

In a development of the invention, the shut-off member is configured as a tube.

Tubes are very rigid with respect to torsional stresses and thus highly stressable and are furthermore cost-effective to produce. The interior of the tube can be used to feed a product to be dropletized. Via through-openings in the tube, the product to be dropletized can then pass into the feed duct and then ultimately to the nozzle strip.

In a development of the invention, the tube is provided with a plurality of through-openings.

In a development of the invention, the through-openings in the tube are arranged at least partially approximately opposite the at least one protrusion for shutting off the at least one supply duct.

In this way, an inflow of the product to be dropletized to the at least one supply duct is homogenized. This is because the product to be dropletized is fed via the interior of the shut-off member of tubular configuration, then passes out opposite the protrusion or protrusions for shutting off the supply duct or supply ducts and then has to pass to the supply ducts or supply duct via the annular gap between the shut-off member and the feed duct. In this way, a type of labyrinth is formed, which ensures a homogeneous inflow of the product to be dropletized.

In a development of the invention, a plurality of protrusions are provided, and the protrusions are arranged in a manner not aligned with one another in the longitudinal direction of the shut-off member.

In this way, a different free cross section, along the length of the feed duct, of the individual supply ducts or of the supply duct can be set easily by rotation of the shut-off member. This is because, as a result of the shut-off member being rotated, the protrusions each pass, in a manner dependent on their position along the length of the shut-off member, in a position in which different covering of the supply duct or supply ducts is realized. It is thus possible for the free cross section of the supply duct or supply ducts to be varied along the length of the shut-off member.

In a development of the invention, the protrusions are arranged along a line extending obliquely with respect to the longitudinal direction, as seen in the longitudinal direction of the shut-off member. Expediently, a distance of the protrusions from a line extending parallel to the longitudinal direction increases in the feeding direction of the product to be dropletized in the feed duct.

Thus, the further the protrusion is arranged from an end of the feed duct at which the product to be dropletized is fed, the less the free cross section of the supply duct can be narrowed. As a result, frictional losses during flow through the feed duct can be compensated and product to be dropletized can impinge on the nozzle strip with a uniform flow along the entire length thereof.

Further features and advantages of the invention can be gathered from the claims and the following description of preferred embodiments of the invention in conjunction with the drawings. Individual features of the different embodiments illustrated and described can be combined with one another as desired here, without departing from the scope of the invention.

DETAILED DESCRIPTION

Figure 1:
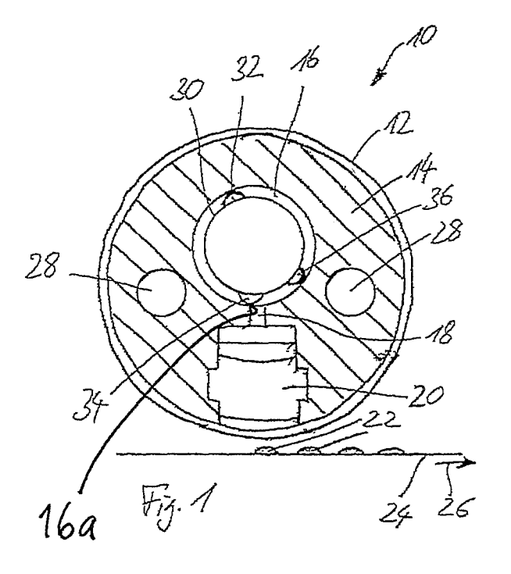
FIG. 1 shows a schematic sectional view of a device according to the invention for dropletizing a flowable product, with a first position of a shut-off member.

The illustration in FIG. 1 shows a schematic side view of a device 10 according to the invention. The device 10 is in this case illustrated schematically and only partially. The device 10 has an outer drum 12 which can rotate on a core 14 by means of drive devices (not illustrated). The outer drum 12 is provided with numerous through-openings. The core 14 is provided with a circular-cylindrical feed duct 16 through which a product to be dropletized, for example a product melt, is fed. Proceeding from the feed duct, the product to be dropletized passes via a supply duct 18 into the region of a distribution device (indicated only schematically in FIG. 1) which is configured as a nozzle strip 20 in the embodiment illustrated. Proceeding from the nozzle strip 20, the product is pushed out of the core radially toward the outside and as a result is also pushed through the through-openings in the outer drum, which rotates relative to the core 14 during operation. As a result, product droplets 22 are produced which are then deposited on a circulating cooling belt 24. The cooling belt 24 circulates in the direction of the arrow 26 about two drums (not illustrated). Since the core 14 is stationary, the droplets 22 are always deposited on the cooling belt 24 beneath the nozzle strip 20 and transported away by the movement of the cooling belt 24 in the direction of the arrow 26. While being moved on the cooling belt 24, the droplets 22 solidify to form product pastilles. These pastilles are then removed from the cooling belt 24.

Provided in the core 14 are two heating ducts 28 through which a suitable heating medium flows and which ensure that the core 14 adopts and maintains a temperature which prevents the product melt, or the product to be dropletized, from solidifying within the feed duct 16, within the supply duct 18 or within the nozzle strip 20.

Only one supply duct 18 is illustrated in the sectional view in FIG. 1. The supply duct 18 can have a slot shape which extends along the entire length of the nozzle strip 20. Expediently, however, a plurality of supply ducts 18 are provided alongside one another, through which the product to be dropletized then passes into the nozzle strip 20.

Provided within the feed duct 16 is a tubular shut-off member 30 which is provided on its outer circumference with a plurality of protrusions 32, 34 and 36. The protrusions 32, 34, 36 are each approximately the same height and ensure that an annular gap is formed between the tubular shut-off member 30 and the inner circumferential surface of the core 14 which forms the feed duct 16. A product to be dropletized is fed through the interior of the shut-off member 30, can then emerge into the annular gap through the through-openings (not illustrated in FIG. 1), and then passes into the supply ducts 18 via the annular gap.

The shut-off member 30 is rotatable about its longitudinal center axis. An axis of rotation of the shut-off member is thus parallel to the longitudinal center axis of the feed duct 16 and coincides therewith in the embodiment in FIG. 1. The drive devices that are necessary for this purpose are not illustrated in FIG. 1. In the position in FIG. 1, the protrusion 34 partially covers an outlet opening 16a of the feed duct 16, from which the supply duct 18 then proceeds. In the state in FIG. 1, the free cross section of the supply duct 18, or a free cross section of the outlet opening 16a, is therefore reduced in size.

Figure 2:
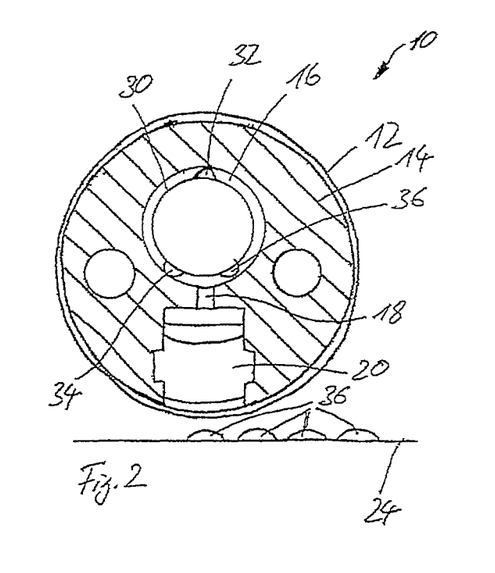
FIG. 2 shows the device from FIG. 1 with a second position of the shut-off member.

FIG. 2 shows a schematic sectional view of the device according to the invention from FIG. 1, wherein, in contrast to FIG. 1, the shut-off member 30 is in a different rotational position than in FIG. 1. Specifically, the shut-off member 30 has been rotated slightly about its longitudinal center axis in the clockwise direction. As a result, the protrusion 34 bears against the inner circumference of the feed duct 16 at a distance from the outlet opening to the supply duct 18. The outlet opening into the supply duct 18 is thus completely cleared. Compared with the state in FIG. 1, a larger flow of the flowable product to be dropletized can pass into the supply ducts 18 as a result.

By means of the shut-off member 30 being rotated relative to the outlet openings to the supply ducts 18, a volumetric flow of the flowable product into the supply ducts 18 can be set in an infinitely variable manner as a result. The supply ducts 18 can in this case be completely cleared, as illustrated in FIG. 2, be partially blocked, as illustrated in FIG. 1, and even be completely closed in a manner that is not illustrated. The shut-off member 30 is preferably rotated manually, but a motorized drive is quite possible within the scope of the invention.

FIG. 2 schematically illustrates that a greater volumetric flow now passes through the supply ducts 18 into the nozzle strip 20, and consequently the deposited product droplets 36 are also larger than the product droplets 22 in FIG. 1. The fact that the product droplets 36 are larger in the position of the shut-off member 30 in FIG. 2 than the product droplets 22 in FIG. 1 serves merely for illustration, however. For example, in the state in FIG. 2, the outer drum 12 could also rotate more quickly relative to the core 14, such that the droplet size would then be smaller again.

What is essential for the invention is that the free cross section of the outlet openings of the supply ducts 18, or a volumetric flow of the flowable product through the supply ducts 18, can be set substantially in an infinitely variable manner, without the device 10 having to be stopped, let alone dismantled. During operation, it is possible, as a result, to optimize the device 10 to the product to be dropletized. Such optimization is carried out for example in that the output droplet size, or the distribution of the droplet size over the width of the cooling belt 24, is optimized. Ideally, all of the droplets 22, 36 deposited on the cooling belt 24 are the same size.

Figure 3:
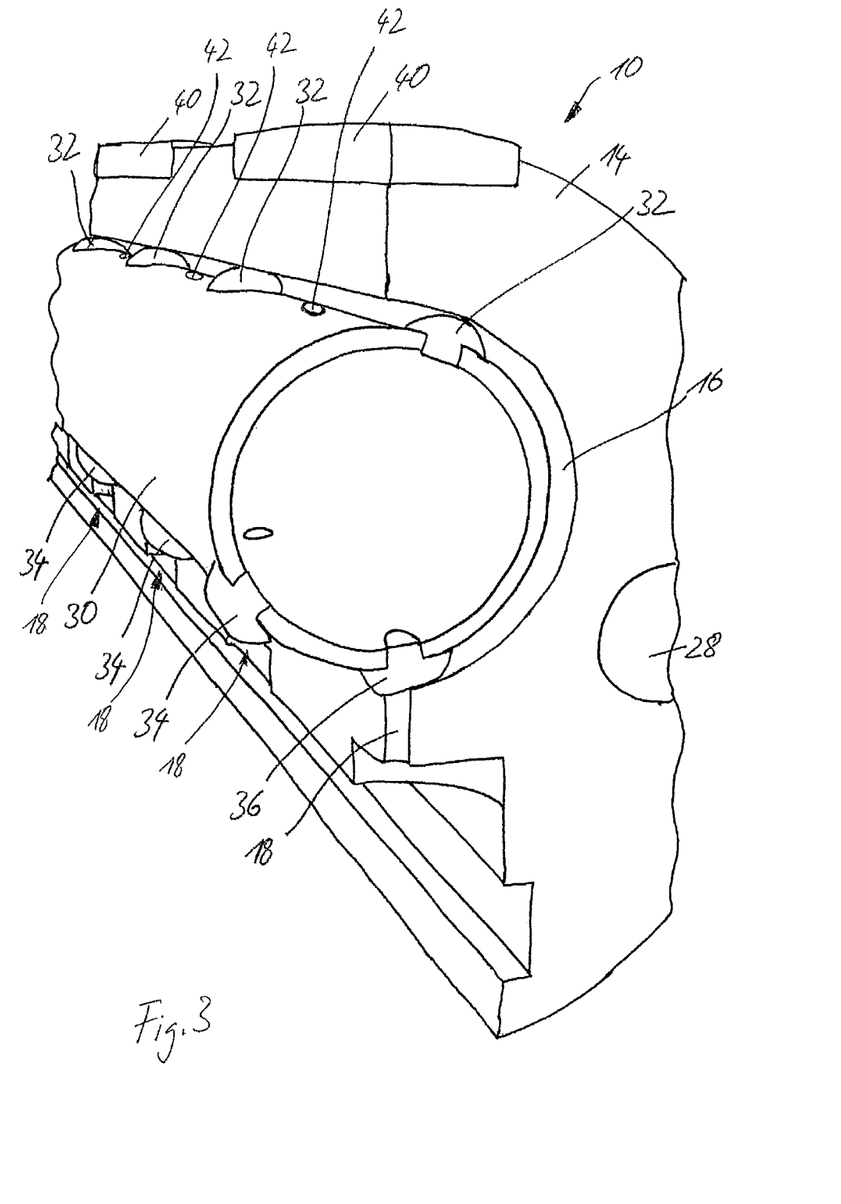
FIG. 3 shows a schematic view in partial section of a device according to the invention in a first position of the shut-off member.

The illustration in FIG. 3 shows a schematic sectional view of a portion of the device 10. Only the core 14 is illustrated, without the outer drum 12 illustrated in FIG. 1. For the sake of clarity, the core 12 is in both cross section and longitudinal section. The core 14 is provided with sliding blocks 40 which rest on the inner side of the outer drum 12 and ensure a small gap between the outer drum 12 and the core 14. A plurality of sliding blocks 40 are distributed in a manner not illustrated around the outer circumference of the core 14.

Shown in FIG. 3 is the feed duct 16, in which the tubular shut-off member 30 is received in a rotatable manner. It can be seen that in each case a plurality of protrusions 32, 34, 36 are arranged one after another in the longitudinal direction of the shut-off member 30. In the state in FIG. 3, the protrusions 36 almost completely cover an outlet opening of the feed duct 18. Thus, only a very small volumetric flow of the product to be dropletized can pass into the supply ducts 18. In the illustration in FIG. 3, only one supply duct 18 and one protrusion 36 can be seen, the other supply ducts 18 and protrusions 36 being concealed.

Figure 4:
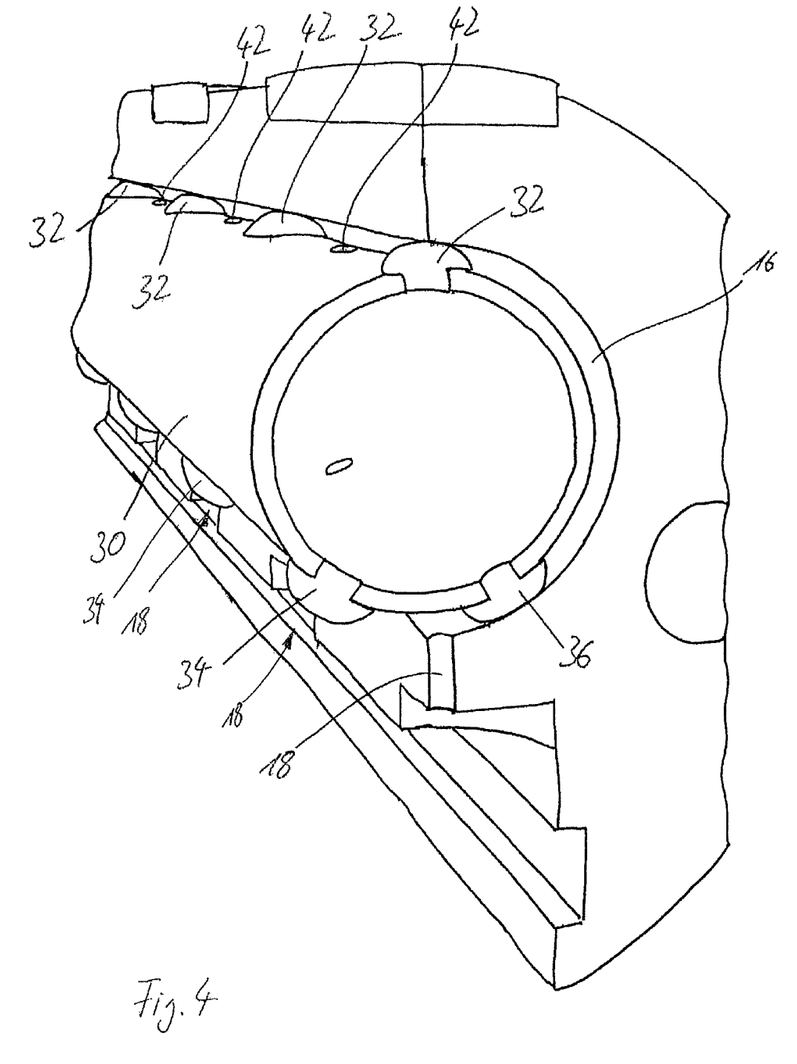
FIG. 4 shows the device from FIG. 3 in a second position of the shut-off member.

In order to clear the cross section of the supply ducts again, the shut-off member 30 can be rotated about its longitudinal center axis. Such a state is illustrated in FIG. 4. A rotation of the shut-off member 30 has taken place in the counterclockwise direction between the state in FIG. 3 and the state in FIG. 4. The protrusion 36 is now away from the outlet opening in the feed duct 16, from which the supply duct 18 proceeds. The cross section of this outlet opening is thus completely cleared in the state in FIG. 4 and the flowable product to be dropletized can utilize the entire cross section of the supply duct 18. Compared with the state in FIG. 3, a much greater volumetric flow of the product to be dropletized passes into the nozzle strip 20 as a result.

Figure 5:
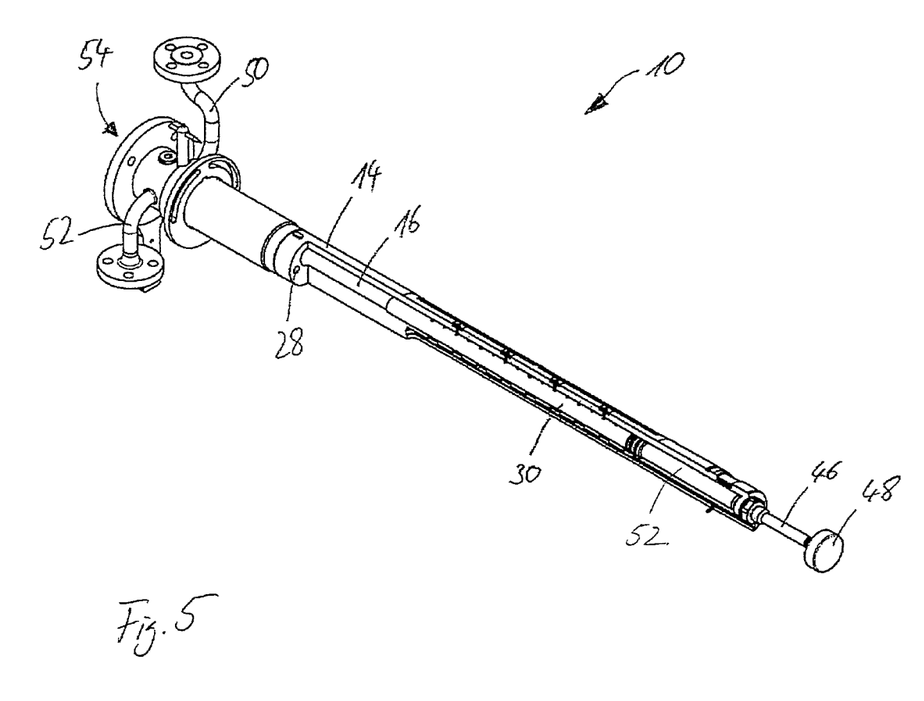
FIG. 5 shows an illustration, obliquely from above, of a portion of a device according to the invention in a partially cutaway state.

The protrusions 32, 34, 36 allow at the same time a rotational movement of the shut-off member 30 and ensure that an annular gap is maintained between the inner circumference of the feed duct 16 and the outer circumference of the shut-off member 30. The product to be dropletized is fed in the axial direction through the interior of the tubular shut-off member 30 and can then pass via the through-openings 42 into the annular gap between the shut-off member 30 and the inner circumference of the feed duct 16. Arranged between in each case two protrusions is a through-opening 42. As seen along the length of the shut-off member, it is thus possible for a uniform amount, per length, of product to be dropletized to emerge into the annular gap. The product to be dropletized is then distributed in the annular gap between the shut-off member 30 and the inner circumference of the feed duct 16 and then has to flow down along the outer circumference of the shut-off member 30 as far as the outlet openings of the supply ducts 18. As a result, very uniform distribution is achieved within the annular gap and thus also within the supply ducts 18.

The illustration in FIG. 5 shows the device 10 according to the invention in part, wherein the core 14 is illustrated partially in section. The feed duct 16 within the core 14 can be seen, into which the shut-off member 30 has been introduced from the right-hand end, in FIG. 5, of the core 14. The shut-off member 30 is coupled, at its right-hand end in FIG. 5, to a portion 52 to which a drive rod 46 is in turn coupled, which can be rotated clockwise and counterclockwise by means of an actuator, for example a drive motor 48.

Lines 50, 52 serve to feed and discharge a heating medium which then flows into the ducts 28 in the core 14. Medium to be dropletized, for example a product melt, is fed axially into the core 14 via a feed opening 54 (not visible in FIG. 5).

The illustration in FIG. 6 shows the shut-off member 30, the drive rod 46 and the drive motor 48 obliquely from above. Provided between the drive rod 46 and the shut-off member 30 provided with the protrusions 32, 34, 36 is the portion 52 which has only a connecting function and is configured as a smooth tube. A first coupling 54 is provided between the drive rod 56 and the portion 52 and a second coupling 56 is provided between the portion 52 and the shut-off member 30. The couplings 54, 56 are each embodied so as to be rigid in the direction of rotation, in order to allow precise rotation of the shut-off member 30.

Figures 6, 7, 8:
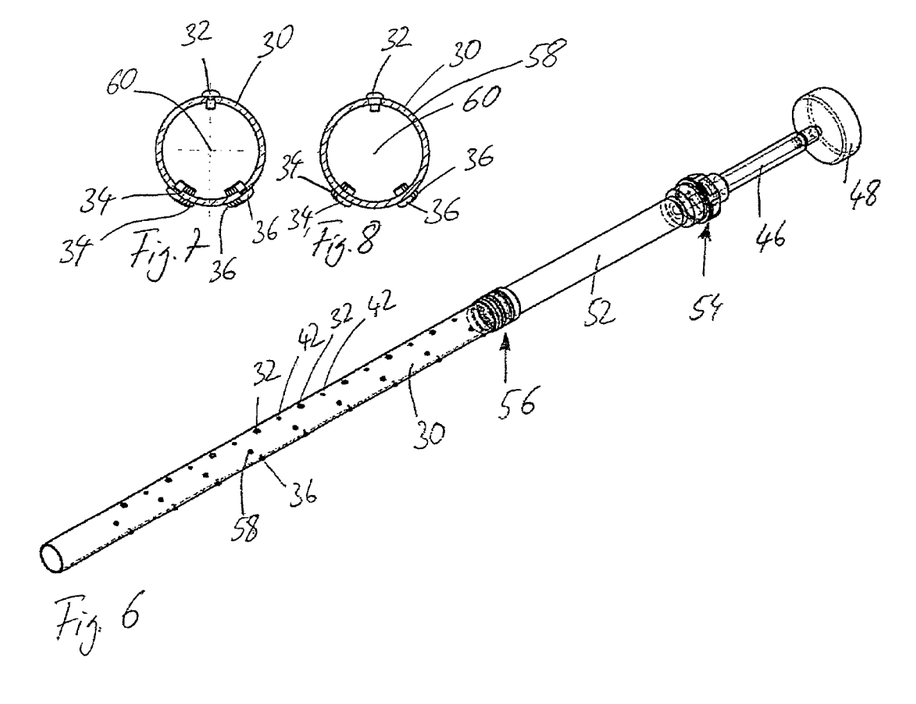
FIG. 6 shows an illustration, obliquely from above, of the shut-off member of the device from FIG. 5.
FIG. 7 shows a first sectional view of the shut-off member from FIG. 6.
FIG. 8 shows a second sectional view of the shut-off member from FIG. 6.

The illustration in FIG. 6 shows the through-openings 42, which are each arranged between two protrusions 32. Further through-openings 58 are arranged on the shut-off member 30 and laterally offset with respect to the through-openings 42. The arrangement and number of the through-openings 42, 58, and also the diameter thereof, can be coordinated with the viscosity of the product to be dropletized.

The illustration in FIG. 7 shows a first sectional view of the shut-off member 30 in the longitudinal direction thereof. It can be seen that the protrusions 32, 34 and 36 are each configured as plastics screws which have been screwed into matching threaded bores in the shut-off member 30. As a result, not only can the protrusions 32, 34, 36 be mounted easily and securely, but they can also be exchanged very easily when they have become worn.

It can also be gathered from FIG. 7 that the protrusions 32 are aligned in the direction of a longitudinal center axis 60 of the shut-off member 30, that is to say are arranged exactly one after another. This is not the case for the protrusions 34 and 36. Rather, a distance between the protrusions 34 and the protrusions 36 decreases continuously in the viewing direction in FIG. 7.

FIG. 8 shows a further sectional view of the shut-off member 30, wherein the viewing direction is in the opposite direction to the viewing direction in FIG. 7. In this viewing direction, a distance between the protrusions 34 and the protrusions 36 increases, the further the protrusions are from the section plane or the viewer. The protrusions 34 and 36 are thus not arranged in an aligned manner one after another with regard to the longitudinal center axis 60, but rather are each arranged along an oblique line, wherein the distance between these two lines increases or, depending on the viewing direction, decreases.

Figure 9:
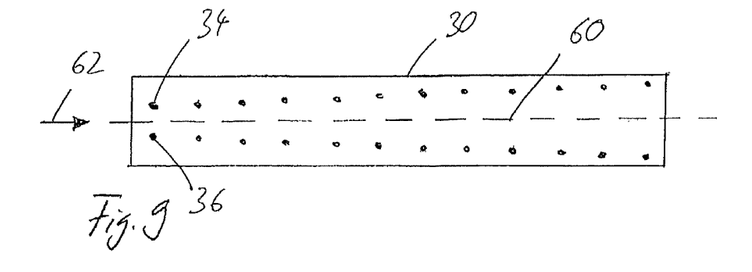
FIG. 9 shows a schematic side view of the shut-off member from FIG. 6 from a first viewing direction.

FIG. 9 shows a side view of the shut-off member 30 in a schematic illustration to clarify the arrangement of the protrusions 34 and 36. An arrow 62 in FIG. 9 shows a feeding direction of the product to be dropletized. It can be seen that a distance between the protrusions 34 and the protrusions 36 increases in the feeding direction 62 of the product to be dropletized. Such an arrangement can be provided in order to shut off to different extents the supply ducts that are aligned exactly with one another in the direction of the longitudinal center axis 60. In the embodiment illustrated in FIG. 9, the feed ducts can thus be shut off to a lesser extent, the further downstream they are with regard to the feeding direction 62. Such a configuration can be chosen in order to ensure flow into the supply ducts 18 that is as uniform as possible along the length of the feed duct 16.

Figure 10:
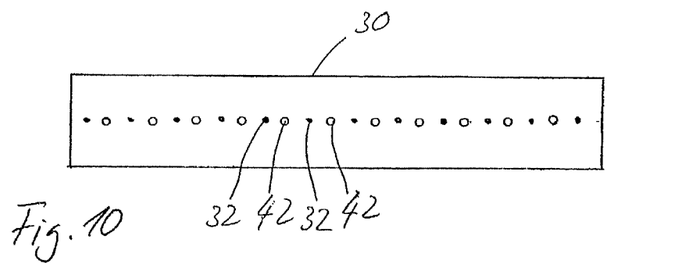
FIG. 10 shows a schematic side view of the shut-off member from FIG. 6 from a second viewing direction.

FIG. 10 shows a further schematic side view of the shut-off member 30, wherein the viewing direction in FIG. 10 is from above onto the protrusions 32 and the through-openings 42 arranged in each case between two protrusions 32.

Figure 11:
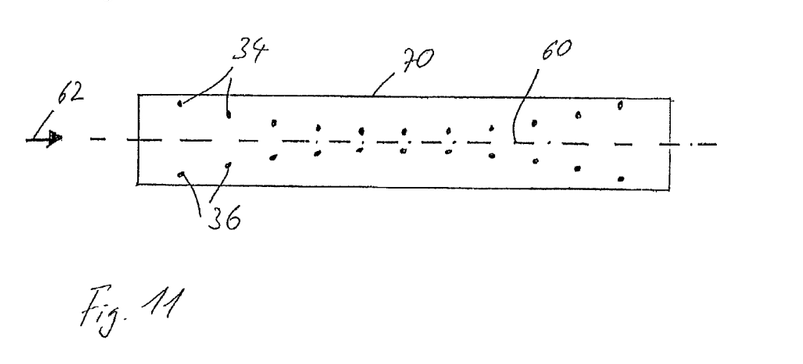
FIG. 11 shows a schematic side view of a shut-off member according to a further embodiment of the invention.

FIG. 11 shows a side view of a shut-off member 70 of a further embodiment of the invention in a schematic illustration. In the case of the shut-off member 70, the protrusions 34, 36 are likewise not arranged in an aligned manner in the direction of the longitudinal center axis 60. The protrusions 34 are arranged on a segment of a circular arc on the surface of the shut-off member 70. Symmetrically with respect to the longitudinal center axis 60, the protrusions 36 are also arranged on a segment of a circular arc. In the direction of the arrow 62, which again shows the feeding direction of the product to be dropletized, the distance between the protrusions 34, 36 is initially large, then decreases down to a minimum half-way along the shut-off member 70, and then increases again to the original value. The two imaginary circular arc lines, on which the protrusions 34, 36 are arranged, are thus located with their convex sides opposite one another. With such an arrangement of the protrusions 34, 36, it is possible, for example, to shut off only the throughflow openings that are located furthest out, i.e. on the left and right in the illustration in FIG. 11, whereas the throughflow openings located in the middle are still completely open. The reverse application is also possible, i.e. the throughflow openings located furthest to the left and right remain open, whereas the throughflow openings located in the middle are at least partially shut off.

Depending on the flow behavior of the product to be dropletized, such an arrangement of the protrusions 34, 36 can thus result in a very uniform droplet size along the entire length of the droplet former.

The invention claimed is:

1. A device for dropletizing a flowable product, said device comprising:
   a core including a feed duct extending in a longitudinal direction of said core, a distribution nozzle and at least one supply duct, said at least one supply duct being disposed between said feed duct and said distribution nozzle, said at least one supply duct joining said feed duct at at least one outlet opening of said feed duct, said at least one outlet opening having a cross-section;
   an outer drum including a plurality of through-openings disposed in an outer circumference of said outer drum, said outer drum being rotatably mounted on said core and having an inner circumference, said distribution nozzle of said core being disposed adjacent said inner circumference of said outer drum; and
   a shut-off member disposed within said feed duct and product to be dropletized is fed through an interior of said shut-off member, said shut-off member being rotatably movable within said feed duct relative to said at least one outlet opening about an axis of rotation coaxial with a longitudinal axis of said feed duct in an assembled and operational state of said device, said shut-off member including at least one protrusion extending outwardly from an outer circumferential surface of said shut-off member, wherein a rotational position of said shut-off member and said at least one protrusion is selectively variable relative to said at least one outlet opening to selectively vary and set a size of said cross-section of said at least one outlet opening in the assembled and operational state of said device by partially covering or wholly covering said at least one outlet opening with said at least one protrusion or by clearing said at least one outlet opening by disposing said at least one protrusion at a distance from the at least one outlet opening.

2. The device according to claim 1, wherein said rotational position of said shut-off member and said at least one protrusion is variable relative to said at least one outlet opening without having to disassemble said device.

3. The device according to claim 1, wherein said shut-off member is cylindrical in configuration.

4. The device according to claim 1, wherein said at least one protrusion comprises a plurality of protrusions, said at least one outlet opening comprises a plurality of outlet openings and said at least one supply duct comprises a plurality of supply ducts each joining said feed duct at a respective one of said plurality of outlet openings, said plurality of protrusions extending outwardly from said outer circumferential surface of said shut-off member and being distributed around said outer circumferential surface, and an annular gap is formed between an inner surface of said core defining said feed duct and said outer circumferential surface of said shut-off member, some of said plurality of protrusions partially covering or wholly covering some of said plurality of outlet openings or being disposed at a distance from some of said plurality of outlet openings to clear same of said plurality of outlet openings, depending on said rotational position of said shut-off member.

5. The device according to claim 4, wherein said shut-off member is configured as a cylindrical tube defining said interior of said shut-off member and the product to be dropletized is fed through said interior of said tube.

6. The device according to claim 5, wherein said cylindrical tube includes a plurality of through-openings in fluid communication with said interior of said cylindrical tube and the product to be dropletized exits said cylindrical tube through said through-openings.

7. The device according to claim 1, wherein said at least one protrusion comprises a plurality of protrusions extending radially outwardly from said outer circumferential surface of said shut-off member, said at least one outlet opening comprises a plurality of outlet openings and said at least one supply duct comprises a plurality of supply ducts each joining said feed duct at a respective one of said plurality of outlet openings, said shut-off member comprising a plurality of through-openings in fluid communication with said interior of said shut-off member and being disposed substantially diametrically opposite to at least some of said plurality of protrusions.

8. The device according to claim 1, wherein said at least one protrusion comprises a plurality of protrusions extending outwardly from said outer circumferential surface of said shut-off member, said at least one outlet opening comprises a plurality of outlet openings and said at least one supply duct comprises a plurality of supply ducts each joining said feed duct at a respective one of said outlet openings, some of said plurality of protrusions being disposed one after the other along a longitudinal extent of said shut-off member along a line parallel to the axis of rotation of said shut-off member.

9. The device according to claim 1, wherein said at least one protrusion comprises a plurality of protrusions extending outwardly from said outer circumferential surface of said shut-off member, said at least one outlet opening comprises a plurality of outlet openings and said at least one supply duct comprises a plurality of supply ducts each joining said feed duct at a respective one of said outlet openings, and a distance between a first group of said plurality of protrusions and a second group of said plurality of protrusions increases in a feeding direction of the product to be dropletized through said shut-off member.

10. The device according to claim 1, wherein said at least one protrusion comprises a plurality of protrusions extending outwardly from said outer circumferential surface of said shut-off member, said at least one outlet opening comprises a plurality of outlet openings and said at least one supply duct comprises a plurality of supply ducts each joining said feed duct at a respective one of said plurality of outlet openings, wherein some of said plurality of protrusions are disposed along said outer circumferential surface of said shut-off member relative to one another so as to form an arc segment when viewing said shut-off member from a side of said shut-off member.

11. The device according to claim 1, wherein said outer circumferential surface of said shut-off member is spaced inwardly from an inner surface of said core defining said feed duct such that an annular space is defined between said outer circumferential surface of said shut-off member and said inner surface of said core, said shut-off member including a plurality of through-openings in fluid communication with said interior of said shut-off member and through which the product to be dropletized exits said shut-off member.

12. A device for dropletizing a flowable product, said device comprising:

an elongate and stationary core including a feed duct having a longitudinal axis extending in a longitudinal direction of said core, said core further including a distribution nozzle and at least one supply duct, said at least one supply duct being disposed to fluidly interconnect said feed duct and said distribution nozzle, said at least one supply duct having a cross-section;

an outer drum mounted on said core for rotation relative to said core, said outer drum including a plurality of through-openings opening through an outer circumference of said outer drum, said distribution nozzle being disposed adjacent an inner circumference of said outer drum to direct flowable product from said at least one supply duct to said through-openings; and a shut-off member disposed within said feed duct adjacent said at least one supply duct and having an interior in fluid communication with a source of flowable product to be dropletized, said shut-off member being rotatable relative to said at least one supply duct within said feed duct about an axis of rotation coaxial with the longitudinal axis of said feed duct, said shut-off member including at least one protrusion extending outwardly from an outer surface of said shut-off member, said shut-off member and said at least one protrusion being rotatable into a selected one of a plurality of rotational positions relative to said at least one supply duct in an assembled and operational state of said device to selectively vary a size of said cross-section of said at least one supply duct and set a desired volumetric flow of flowable product through said at least one supply duct by partially covering or fully covering said at least one supply duct with said at least one protrusion, or by clearing said at least one supply duct by disposing said at least one protrusion at a distance from said at least one supply duct.

13. The device according to claim 12, wherein said shut-off member comprises a tubular configuration defining said interior through which product to be dropletized is fed.

14. The device according to claim 12, wherein said core includes an inner surface defining said feed duct and said at least one protrusion extends radially outwardly from said outer surface of said shut-off member towards said inner surface of said core.

15. The device according to claim 12, wherein said at least one protrusion comprises a plurality of protrusions and said at least one supply duct comprises a plurality of supply ducts and an annular gap is formed between an inner surface of said core defining said feed duct and said outer surface of said shut-off member, some of said plurality of protrusions partially covering or fully covering some of said plurality of supply ducts or being disposed at a distance from some of said plurality of supply ducts to clear said some of said plurality of supply ducts, depending on which of the selected one of the plurality of rotational positions the shut-off member and the some of the plurality of protrusions are arranged.

* * * * *